United States Patent

[11] 3,600,028

[72] Inventor Wilhelm Henning
 64 Heggerstrasse, 432 Hattingen, Germany
[21] Appl. No. 19,036
[22] Filed Mar. 12, 1970
[45] Patented Aug. 17, 1971
[32] Priority Mar. 12, 1969
[33] Germany
[31] P 19 12 421.1

[54] DEVICE FOR INSERTING AND REMOVING CONTACT LENSES
 6 Claims, 6 Drawing Figs.

[52] U.S. Cl. .................................................. 294/1 CA
[51] Int. Cl. ................................................... G02c 11/00
[50] Field of Search ........................................ 294/1 CA

[56] References Cited
 UNITED STATES PATENTS
 3,129,971  4/1964  Kobler ................... 294/1 CA
 3,139,298  6/1964  Grabiel .................. 294/1 CA FOREIGN PATENTS
 1,255,345  11/1967  Germany .................... 294/1 CA Primary Examiner—Evon C. Blunk
Assistant Examiner—I. Kenneth Silverman
Attorney—Walter Becker ABSTRACT: An apparatus for inserting and removing contact lenses, which includes a suction head for a contact lens which is mounted at one end of a tube and permits the eye to view through the lens supporting member, and which also includes focusing light means adapted to be viewed through said tubular means, said tubular means being displaceable in a sleeve while the apparatus is equipped with a closing contact which in response to a pull out of the tubular means automatically turns on a fixation light, whereas when moving the tube inwardly the light is extinguished, said apparatus being equipped with suction creating means operable in response to a slight movement of the supporting means in the direction toward the sleeve means and becoming effective when the contact lens engages the supporting means so that said lens will be firmly drawn to and held by said lens supporting means.

PATENTED AUG 17 1971 3,600,028

INVENTOR
Wilhelm Henning
BY
Walter Becker

INVENTOR
Wilhelm Henning

DEVICE FOR INSERTING AND REMOVING CONTACT LENSES

In German Pat. No. 1,255,345 there is described a device for inserting contact lenses in and taking contact lenses out of the eyes, which device is provided with a suction head forming a support for the contact lens. This support is located at one end of a tube and permits looking through in the direction of the optical axis of the respective eye. The device is furthermore provided with a fixation lamp arranged in the longitudinal axis of the tube, said tube being displaceable in a sleeve. The device is equipped with a closing contact which when the tube is pulled out closes the circuit for the fixation lamp, and interrupts said circuit thereby turning off said lamp when the tube is moved inwardly. In order with the device of the above mentioned patent for removing the contact lens from the eye, to produce an underpressure in the support, a hose is moved through a bore in the upper portion of the tube, which hose tightly closes off in downward direction the upper section of the support. By means of a rubber ball or the like arranged at the other end of the hose, it is possible in the suction head to produce the necessary underpressure.

While the above mentioned device has proved very satisfactory for inserting contact lenses into an eye, difficulties have been encountered when the contact lens is to be removed. These difficulties are due to the fact that the user of the rubber ball for producing the underpressure has to actuate the rubber ball at the very moment at which the device touches the contact lens in the eye. Aside from the fact that in this connection uncontrollable reflex movements may occur, it has been found that most people are not able to concentrate on one hand upon the fixation lamp, which means to move the device properly to the eye, and on the other hand cannot simultaneously check the decisive moment at which the ball has to be actuated. Therefore, the contact lens may get displaced in the eye and disorders may occur, which means that the device operates not always satisfactorily when the removal of the contact lens is involved.

It is, therefore, an object of the present invention so to design the device of the above mentioned type that also the removal of the contact lens can be effected safely and automatically and that the above mentioned drawbacks will be avoided even if the device is handled by some awkward persons.

These and other objects and advantages of the invention will appear more clearly from the following specification, in connection with the accompanying drawings, in which.

Figure 5:
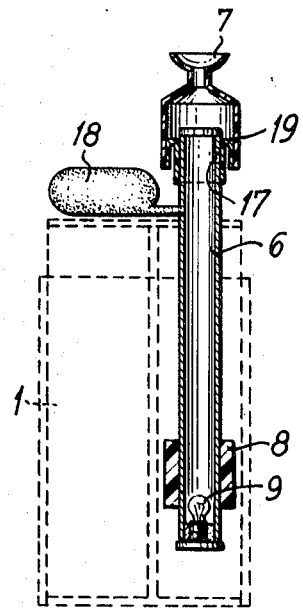
Figure 6:
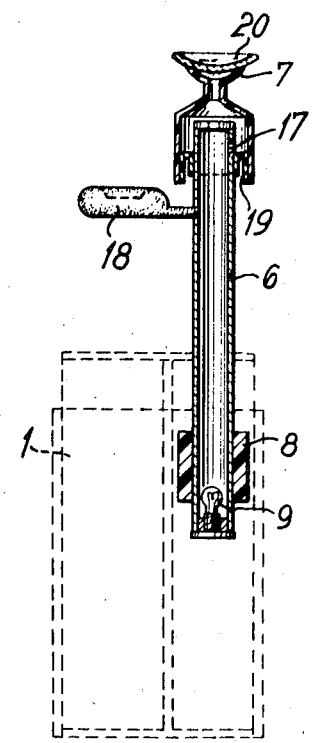

FIGS. 5 and 6 respectively illustrate modifications of the device according to the invention.

The device according to the present invention for inserting and removing of contact lenses with a suction head forming a support for the contact lens is characterized primarily in that it is provided with devices for producing a slight underpressure at the end of the support and that said underpressure, when the tube is pulled out completely, will after a slight displacement of the support in the direction toward the sleeve automatically become effective when the contact lens engages the support so that said contact lens will be firmly drawn against said support.

The most important feature is therefore seen in that the underpressure occurring at the marginal area of the support will automatically be released and become effective at the instance at which the support is displaced downwardly. If, at this time, the contact lens rests on the suction head, said lens will be attracted and together with the tube rubs downwardly. It is a matter of course that the underpressure must be in excess of the adhesion force exerted by the eye onto the contact lens. On the other hand, the pressure must not be so high that during a direct withdrawal of the lens, the cornea will suffer damage to the epithelium. The present invention provides a number of solutions to the problem outlined above. For instance, it is suggested according to the present invention to close the lower end of the tube with a small ball which when the device is to be used for removing a contact lens from the eye and when the tube is pulled out completely is pressed in and held in this condition by devices which, when the tube is being depressed, are released so that the ball can again expand and in the tube produces an underpressure when the tube is closed at the top, for instance, by the contact lens resting thereupon. The devices for depressing the ball may be of a mechanical nature and may be manually operable when the tube is pulled out of the sleeve. According to a particular embodiment of the invention, the device for depressing the ball may be in the form of an outer tube coaxially surrounding said first mentioned tube and provided with a yoke extending around the ball and adapted to depress the same when said ball is pulled up with the outer tube. In this instance, simultaneously a locking member locks, which holds the ball in this condition and which is released when depressing the tube.

Accordingly, it is furthermore possible to connect a magnetic core to a diaphragm adapted to close the lower end of the tube, and in the tube to provide a coil in which, when the tube is pulled out, a circuit can be closed so that the magnetic core with the diaphragm is pulled into the coil whereas when depressing the tube, the circuit is interrupted and the core with the diaphragm drops back into its starting position and produces the required underpressure at the support.

According to another embodiment of the invention, a hollow ball or the like for supporting an underpressure in the tube is connected to the tube closed at both ends, said tube in the vicinity of the support being provided with a lateral opening. Below the said lateral opening there is provided a diaphragm to which the support is connected while the diaphragm is so arranged on the tube that it closes the opening in an upper position and releases or frees the opening when the support is moved downwardly.

Figure 1:
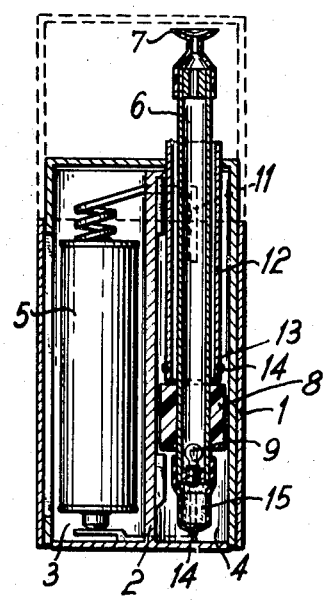
FIG. 1 represents a longitudinal section through a device with inserted tube.

Referring now to the drawings in detail, the device illustrated in FIG. 1 comprises an outer sleeve 1 into which an insert 2 is placed, said insert 2 comprising two chambers 3 and 4. In chamber 3 there is located a battery 5, and in the chamber 4 there is arranged a tube 6 which is adapted to be displaced between an upper and a lower abutment. At the upper end of tube 6 there is mounted a support 7 in the form of a suction head, whereas the lower end of the tube is provided with a thickened portion 8 for guiding in chamber 4. Inserted into the lower end of the pipe 6 is a bulb 9, the electric contacts 10 of which are at opposite sides of the thickened portion 8 passed outwardly. At the upper end of the chamber 4 at the corresponding areas there are provided the contacts 11 of the battery so that when the tube is displaced in the chamber in upward direction the incandescent lamp 9 will light up. The arrangement is such that the tube drops freely downwardly when the contacts no longer engage each other.

Figure 2:
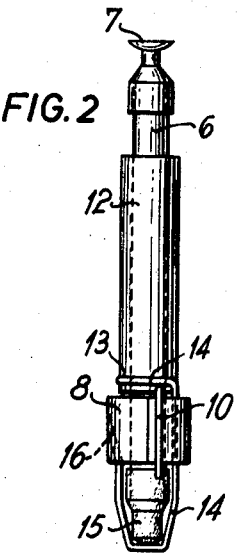
FIG. 2 is a view of the tube in the position of FIG. 1, but turned by 45°.

Tube 6 is coaxially surrounded by a thicker outer tube 12 which protrudes from sleeve 1. This outer tube has its lower end provided with an annular groove 13 engaged by a yoke 14 which latter is guided by the thickened portion 8 of the tube 6 and extends around a ball 15 placed upon the lower end of the tube. The lower end of the yoke resiliently engages a latch member 16 in such a way that the yoke can be displaced between two positions. The rest position is shown in FIGS. 1 and 2. The outer tube 12 rests on the thickened portion 8 while the yoke 14 is in its lower position and the end of the yoke rests against the latching member 16. After outer tube 12 is subjected to a pull in upward direction when the tube 6 is pulled out, also yoke 14 moves into the upper position and depresses the ball 15. Simultaneously, the yoke 14 latches behind the latch member 16 and is fixed in this position shown in FIGS. 3 and 4 in which the end of the yoke extends into a recess in the wall of the insert 2. When the tube 6 is displaced in downward direction, shortly after the start of this movement, the end of the yoke is pressed by the wall of the insert 2 against the thickened portion while the yoke 14 latches out of the latching member 16 and the ball, due to its elasticity assumes the position shown in FIGS. 1 and 2. If, at this instance, the upper end of the tube 6 is closed, for instance, by a contact lens lying on the support 7, an underpressure forms in the tube which exerts a suction upon the contact lens.

The device according to the invention operates as follows:
1. Inserting a Contact Lens.

The device illustrated in FIG. 1 is placed upon a support, for instance, a table, and the tube 6 is pulled upwardly until it hits an abutment. In this instance, the contacts 10 and 11 engage each other and the incandescent bulb 9 lights up. In view of the friction at the contacts the tube 6 is held in this upper position. The contact lens to be inserted is placed upon a support which may also be done prior to pulling out the tube, and the person who wants to use the lens approaches the device while at the same time pulling apart the eyelids. As long as he sees the fixation light, it will be assured that the contact lens will reach the cornea. The tube 6 is now with the eye displaced in downward direction and as soon as the contacts 10 and 11 no longer engage each other and the light extinguishes, the tube 6 drops downwardly whereas the contact lens adheres to the eye.

2. Removal of the Inserted Contact Lens.

Figure 3:
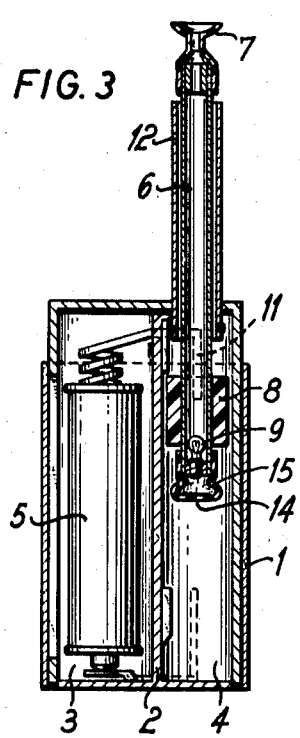
FIG. 3 represents a longitudinal section through a device according to the invention with the tube pulled out.
Figure 4:
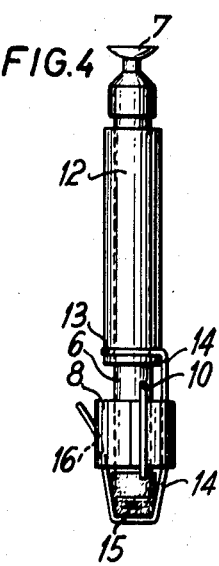
FIG. 4 shows a view of the tube in a position corresponding to that of FIG. 3, but turned with regard thereto by 45°.

In order to remove the contact lens from the eye, first the tube 6 is pulled out and additionally the outer tube 12 is pulled upwardly so that the device will occupy the positions shown in FIGS. 3 and 4 in which the ball 15 is pressed in. The user of the contact lens now approaches the device while observing the fixation light and by means of the eye or the contact lens presses the tube 16 downwardly. In this connection, as described above, the latch 16 is automatically released and thus an underpressure forms at the support 7. which underpressure draws the contact lens from the eye. The rod drops downwardly similar to the operation during the insertion of the contact lens and pulls the contact lens on which is drawn against the support off the eye without any manipulations on the part of the wearer of the contact lens.

With the embodiment according to FIGS. 5 and 6, the employment of the outer tube 12, of the yoke 14 and of ball 15 is not necessary. Instead, the tube 6 which is closed at the top and at the bottom is in the vicinity of its upper end provided with a lateral opening 17 and a diaphragm 19 having arranged thereon the support 7 for the contact lens. The diaphragm 19 is so connected to the tube that in an upper position it closes the opening 17 (FIG. 5) and in a lower position it frees said opening (FIG. 6). Connected to the tube is a ball 18 by means of which an underpressure can be produced in the tube. When the ball is pressed together, a part of the air in the tube is removed through the opening 17. When releasing the ball, the diaphragm closes the opening so that an underpressure is formed in the tube. In this condition, the device is moved toward the eye or the contact lens on the eye while the tube 6 is pulled out of the sleeve and the fixation light is illuminated. When the support is displaced downwardly, also the diaphragm is displaced and frees the opening so that the underpressure prevailing in the tube will become effective and draws the contact lens 20 against the support (FIG. 6). If tube 6 is moved further downwardly, it will, together with the contact lens thereon, drop downwardly as previously described in connection with the insertion of the contact lens.

As will be evident from the above, the device according to the invention is completely foolproof and can be used by older awkward persons for insertion and for the removal of contact lenses. Furthermore, it can also, without danger, be employed by a person aiding the lens wearer, especially for removing contact lenses slipped off the cornea and out of the lid gap.

It is, of course, to be understood that the present invention is, by no means, limited to the particular construction shown in the drawings, but also comprises any modifications within the scope of the appended claims.

What I claim is:

1. An apparatus for inserting contact lenses into and removing the same from an eye, which includes: housing means, tubular means slidably movable in said housing means from an inner position to an outer position and vice versa, said tubular means being adapted to be placed in a substantially vertical position for use, light means arranged at the lower end of said tubular means when the latter is in its substantially vertical position, supporting means arranged at the other end of said tubular means and adapted to receive and support the contact lens to be inserted or to be removed, said supporting means permitting viewing said light means through said supporting means and said tubular means, electric current supply means operable automatically in response to said tubular means reaching said outer position to supply current to said lamp to light up the same, said tubular means also being operable in response to said tubular means leaving said outer position on its way toward said inner position to interrupt current supply from said electric current supply means to said light means to thereby extinguish said light means while permitting said tubular means adapted manually to be preset and operable when in preset condition to exert a suction effect upon the lens receiving surface of said supporting means in response to said supporting surface moving inwardly from said outer position to exert a suction upon the lens receiving surface of said supporting means for withdrawing a contact lens from the eye of a wearer.

2. An apparatus according to Claim 1, in which said suction creating means includes hollow compressible elastic means closing said lower end of said tubular means and having its interior in communication with said tubular means, sleeve means surrounding said tubular means and movable selectively from an ineffective position to an effective position, and vice versa, and control means associated with said sleeve means and operable in the effective position of said tubular means to compress said compressible elastic means and to release said compressible means in response to said tubular means leaving its outer position.

3. An apparatus according to Claim 2, in which said control means for compressing said hollow compressible elastic means comprises manually operable mechanical means in the form of an outer tube surrounding said tubular means movable from an inner to an outer position and vice versa, said outer tube being provided with a yoke extending around said hollow compressible elastic means.

4. An apparatus according to Claim 3, which includes latching means holding said hollow compressible elastic means in compressed condition as long as said outer tube occupies said outer position.

5. An apparatus according to Claim 1, which includes diaphragm means closing the lower end of said tubular means, magnetic core means connected to said diaphragm means, and coil means arranged within said tubular means, means responsive to said tubular means occupying its outer position to close a circuit through said coil means to thereby cause said magnetic core means together with said diaphragm means to be pulled upwardly into the coil means, said tubular means when being depressed interrupting said circuit and permitting said magnetic core with said diaphragm means to drop to its starting position for producing the required lower underpressure at said lens receiving and supporting means.

6. An apparatus according to Claim 1, in which said tubular means is closed at both ends and in the vicinity of said lens receiving and supporting means is provided with a lateral opening, hollow compressible elastic means communicating with the interior of said tubular means for producing an underpressure, and diaphragm means arranged below said lateral opening and having said lens receiving and supporting means mounted thereon, said diaphragm being mounted on said tubular means so as to close said opening in the outer position of said tubular means and to release said opening in response to the supporting means being displaced downwardly.